US006650222B2

(12) United States Patent
Darr et al.

(10) Patent No.: US 6,650,222 B2
(45) Date of Patent: Nov. 18, 2003

(54) MODULAR FUSEHOLDER

(75) Inventors: Matthew Rain Darr, Alton, IL (US); Robert Stephen Douglass, Wildwood, MO (US)

(73) Assignee: Cooper Technologies Company, Houston, TX (US)

(*) Notice: Subject to any disclaimer, the term of this patent is extended or adjusted under 35 U.S.C. 154(b) by 39 days.

(21) Appl. No.: 09/992,852

(22) Filed: Nov. 19, 2001

(65) Prior Publication Data

US 2002/0067240 A1 Jun. 6, 2002

Related U.S. Application Data

(60) Provisional application No. 60/254,087, filed on Dec. 7, 2000.

(51) Int. Cl.[7] .......................... H01H 85/20; H02B 1/18

(52) U.S. Cl. ...................... 337/187; 337/189; 337/255; 361/833

(58) Field of Search ................................ 337/186–189, 337/255, 260, 268; 361/104, 626, 642, 646, 833, 835, 837

(56) References Cited

U.S. PATENT DOCUMENTS

| | | | | | |
|---|---|---|---|---|---|
| 1,966,716 | A | * | 7/1934 | Green | 337/194 |
| 2,072,729 | A | * | 3/1937 | Corbett | 337/196 |
| 2,186,813 | A | * | 1/1940 | Adam et al. | 337/210 |
| 2,617,847 | A | * | 11/1952 | Cole | 439/621 |
| 3,202,788 | A | * | 8/1965 | George | 337/194 |
| 4,851,963 | A | * | 7/1989 | Miller et al. | 361/643 |
| 4,966,561 | A | * | 10/1990 | Norden | 439/622 |
| 5,186,637 | A | * | 2/1993 | Norden | 439/133 |
| 5,269,706 | A | * | 12/1993 | Spanio | 439/621 |
| 5,355,274 | A | * | 10/1994 | Marach et al. | 361/104 |
| 5,515,023 | A | | 5/1996 | Marach et al. | |
| 5,969,587 | A | * | 10/1999 | Combas | 335/132 |
| 5,973,418 | A | * | 10/1999 | Ciesielka et al. | 307/130 |

FOREIGN PATENT DOCUMENTS

| | | | | | |
|---|---|---|---|---|---|
| EP | 807950 | A1 | * | 11/1997 | H01H/85/54 |
| FR | 2304164 | A | * | 11/1976 | H01H/27/00 |
| FR | 2513006 | A | * | 3/1983 | H01H/3/54 |
| GB | 2153163 | A | * | 8/1985 | H01H/85/54 |

OTHER PUBLICATIONS

Cooper Patent Application Request, “45 mm Wide Fuse-holder”, Prior Art and Patents, pp. 3 and 4.

* cited by examiner

*Primary Examiner*—Anatoly Vortman
(74) *Attorney, Agent, or Firm*—Armstrong Teasdale LLP

(57) ABSTRACT

A fuseholder includes a main housing configured for receiving a plurality of cartridge fuses, a fuse drawer configured for slidable insertion into the main housing, and a handle coupled to the drawer for opening the drawer to release fuses from the main housing. The drawer includes a retractable handle that is substantially flush with the drawer when the drawer is closed. A handle recess is located adjacent the drawer for prying the handle open with a tool. A drawer frame includes a lock opening therethrough for a lock member to prevent closing of the fuse drawer as desired. Built-in fuse rejection members are included in the main housing to prevent use of incorrect fuses with the fuseholder and an auxiliary contact actuator is provided for added features on an as needed basis.

20 Claims, 12 Drawing Sheets

MODULAR FUSEHOLDER

CROSS REFERENCE TO RELATED APPLICATIONS

This application claims the benefit of U.S. Provisional Application Ser. No. 60/254,087, filed Dec. 7, 2000.

BACKGROUND OF THE INVENTION

This invention relates generally to fuseholders for cartridge fuses, and, more particularly, to modular fuseholders for industrial control devices.

Historically, ferrule or cartridge-type fuses have been employed in open fuseholders and fuseblocks. The fuses are retained in fuse clips, and serve to protect load side equipment from damaging fault currents by opening a fuse link and breaking an electrical circuit through the fuse link between a power source or line side device or circuit and a load side power receiving device or circuit. Open fuseholders and fuseblocks, however, present a risk of electric shock by exposing energized metal surfaces of the fuse and the fuse block to inadvertent contact when the fuse is energized. Furthermore, a fuse puller is typically required to remove the fuses from the clips, and if a fuse puller is not available, attempts to remove the fuses with other tools such as screwdrivers and pliers may be made, thereby endangering a user and damaging the fuseholder or fuseblock.

Consequently, efforts have been made to improve the safety and convenience of cartridge fuses in use, and modular fuseholders have been developed with fuses and fuse clips enclosed in a protective housing to prevent accidental contact with exposed and energized metal surfaces of the fuse and fuseholder. Further, at least in some types of modular fuseholders, a drawer is used to house one or more fuses and the fuses are pulled from contact clips by opening the drawer, thereby eliminating use of tools to remove fuses from the clips. See, for example, U.S. Pat. No. 5,515,023. While these modular fuseholders have improved safety of cartridge fuses to trained users, hazardous conditions have been encountered in their use because they may be easily opened while the fuses are energized and under load, which can cause dangerous arcing to occur between the fuses and the contact clips. In addition, the drawer often is completely removable from the fuseholder body, thereby undesirably exposing energized metal portions of the fuseholder. Further, the fuse drawers are vulnerable to undesirable loading and operation with fuses of a different capacity, i.e., voltage and current rating, than for which the fuseholder was designed or intended to be used in a given application.

Moreover, at least some types of modular fuseholders, such as those used for industrial control devices, contain added features that are not always desired or necessary for certain applications. For example, some modular fuseholders designed to accommodate UL (Underwriters Laboratories) Class CC fuses and IEC (International Electrotechnical Commission) 10×38 fuses that are commonly used in industrial control devices include permanently mounted auxiliary contacts and associated rotary cams and switches to provide early-break and late-make voltage and current connections for motor control applications. However, these features increase costs and complicate assembly of the fuseholder. It would be desirable to provide a simpler, lower cost and more universally applicable fuseholder that could be easily upgraded to include added features on an as needed basis.

BRIEF DESCRIPTION OF THE INVENTION

In an exemplary embodiment, a fuseholder includes a main housing configured for receiving a plurality of cartridge fuses, a fuse drawer configured for slidable insertion into the main housing, and a handle coupled to the drawer for opening the drawer to release fuses from the main housing. The fuse drawer is selectively positionable between an open position for loading and unloading of fuses, and a closed position wherein energized metal surfaces of the fuse and main housing are enclosed. The drawer handle is selectively positionable between an extended position and a retracted position relative to the drawer, and the handle is substantially flush with the drawer when in the retracted position. Therefore, the handle is not easily manipulated with one's fingers when the fuse drawer is closed, thereby reducing a likelihood that the fuse drawer will be opened when the fuseholder is under voltage and current loads. Hazardous arcing conditions are thus avoided, and safety of the fuseholder is improved.

The drawer includes a handle recess adjacent the drawer, and the drawer handle may be released from its retracted position by prying the handle open with a tool, such as a flat blade screwdriver, inserted into the handle recess. The fuse drawer includes a drawer frame having a lock opening therethrough, and a lock member, such as a padlock is insertable into the lock opening to prevent closing of the fuse drawer as desired. Built in fuse rejection members are included in the main housing to prevent use of unacceptable fuses with the fuseholder, thereby further improving safety and facilitating proper use of the fuseholder.

The main housing further includes an auxiliary contact actuator that is selectively positionable between a first position and a second position in response to a position of the fuse drawer. A removable auxiliary contact cover provides access to the contact actuator, and a known switch assembly may be plugged into the main housing for actuation by the auxiliary contact actuator to upgrade the fuseholder to include advanced features, such as early-break and late-make voltage and current contacts. Thus, costly switching components are avoided in the fuseholder itself. A variety of terminal options, including screw terminals and spring terminals allow versatile wiring options in the field.

Therefore, a safer, lower cost, and versatile fuseholder is provided for efficiently providing fused connections for, for example, industrial control devices.

DETAILED DESCRIPTION OF THE INVENTION

Figure 1:
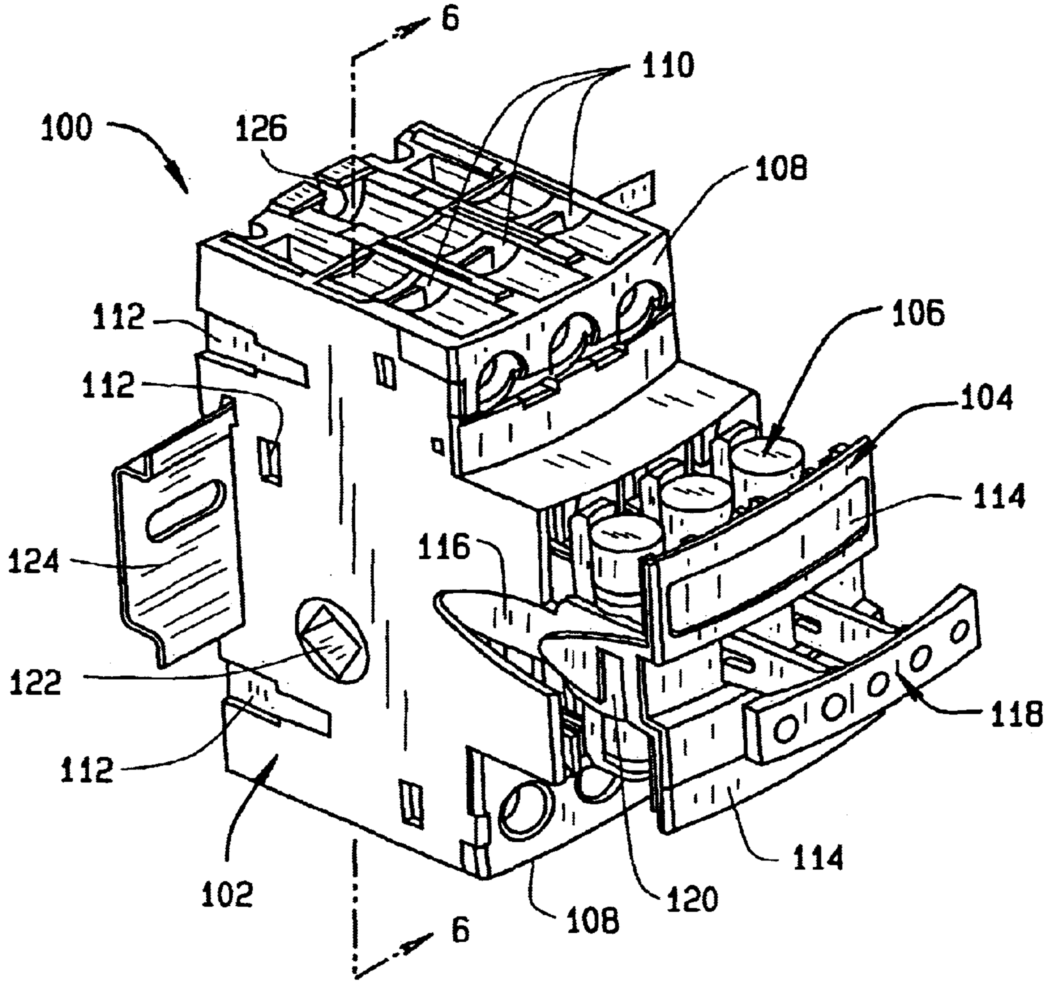
FIG. 1 is a perspective view of a modular fuseholder in an open position.

FIG. 1 is a perspective view of a modular fuseholder 100 including a main housing 102 and a slide out fuse drawer 104 that receives a plurality of known cartridge or ferrule fuses 106. Main housing 102 includes fuse clips (not shown in FIG. 1) that engage fuses 106 when drawer 104 is in a closed position, as further described below. Terminal covers 108 are attached to either side of main housing 102 adjacent fuse drawer 104 and include wiring ports 110 for completing standard screw-type line side and load side electrical connections to the fuse clips, and therefore ultimately through fuses 106 when fuse drawer 104 is closed to complete an electrical circuit through the fuse clips. Main housing 102 includes dovetail slots 112 for receiving interlocking projections (not shown in FIG. 1) of other modular fuseholder components, such as another fuseholder main housing or an additional pole housing (not shown in FIG. 1) described below.

Fuse drawer 104 is coupled to main housing 102 and is in sliding engagement therewith for selective positioning between an open position (as shown in FIG. 1) and a closed position wherein fuses 106 are fully engaged with the main housing fuse clips and the conductive metal surfaces of the fuse clips. In the closed position, fuses 106 are fully enclosed by nonconductive material, such as thermoplastic in an exemplary embodiment, from which drawer 104 and main housing 102 are fabricated. Fuse drawer 104 includes a front cover 114, lateral extensions 116 extending into main housing 102 on either side of front cover 114, and a retractable handle 118 extending outwardly from drawer front cover 114 for opening drawer 104 and pulling fuses 106 from the main housing fuse clips. Drawer lateral extensions 116 include a dovetail slot 120 to receive interlocking projections (not shown in FIG. 1) of another fuse drawer or an additional pole drawer attachment (not shown in FIG. 1) described below. Lateral drawer extensions 116 further include cam bearing bosses (not shown in FIG. 1) that cooperate with drawer operator cams (not shown in FIG. 1) to facilitate relative sliding movement between drawer 104 and main housing 102. Drawer cam actuator openings 122 extend through main housing 102 for remote mechanical actuation of fuse drawer 104 with a rotary device (not shown) in driving engagement with drawer cam actuator openings 122.

In the illustrated embodiment, fuse drawer 104 contains three cartridge fuses 106 and is therefore particularly suited for a three phase power application, and fuses 106 are arranged side-by-side in a linear fashion to minimize a depth of main housing 102 and a required space for opening fuse drawer 104 to add or remove fuses 106. In alternative embodiments, fuse drawer 104 is constructed to accommodate greater or fewer than three fuses 106, and alternative arrangements of fuses 106 relative to one another are employed. Further, in an exemplary embodiment, fuses 106 are UL Class CC fuses, UL supplemental fuses, or IEC 10×38 fuses that are commonly used in industrial control applications, and main housing 102 is about 45 mm wide in accordance with IEC industry standards for, for example, contactors, relays, manual motor protectors, and integral starters that are also commonly used in industrial control systems applications. Therefore, while in an exemplary embodiment fuseholder 100 is particularly suited for industrial control systems applications, the benefits of the invention accrue equally to fuseholders of other dimensions and for different applications.

In one embodiment, main housing 102 is mounted on a known DIN rail 124. In an alternative embodiment, main housing 102 is chassis mounted through screw bosses 126 formed integrally with main housing 102.

Figure 2:
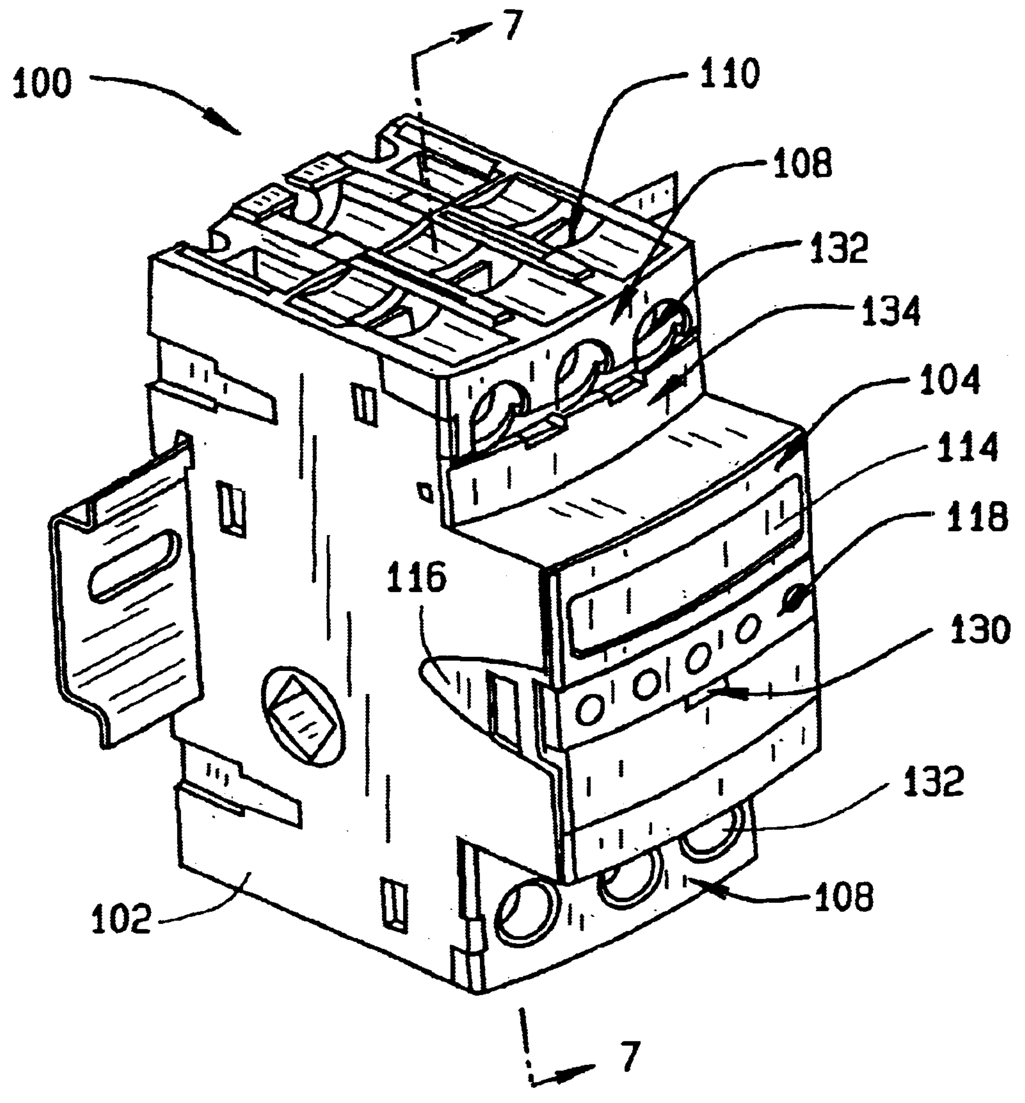
FIG. 2 is a perspective view of the fuseholder shown in FIG. 1 in a closed position.

FIG. 2 is a perspective view of fuseholder 100 with drawer 104 in a closed position. Drawer lateral extensions 116 are located within main housing 102 and drawer front cover 114 closes main housing 102 to prevent inadvertent contact with energized metal surfaces of fuseholder 100 or fuses 106 (shown in FIG. 1) in use. Retractable handle 118 is in a fully retracted position that is substantially flush with drawer front cover 114. As such, handle 118 is generally inaccessible and is difficult to access with one's fingers. Rather, handle 114 is easily extendible only when a tool (not shown), such as a flat blade screwdriver, is inserted into a handle access opening or recess 130 in drawer front cover 114. The tool can then be used to pry handle 118 into a released position wherein it may be gripped by a user's fingers to open fuse drawer 104. Therefore, in comparison to known fuseholders including permanently extended drawer handles, fuse drawer 104 with retractable handle 118 is less likely to be casually opened while fuseholder 100 is under load, thereby avoiding unintended hazardous arcing conditions between fuses 106 and the main housing fuse clips.

Terminal covers 108 are attached to main housing 102 and include screw terminals 132 for establishing electrical connections to respective fuses 106 (shown in FIG. 1) through wiring ports 110 according to known techniques. A removable auxiliary contact cover 134 is located above fuse drawer 104 for plug-in access for an optional auxiliary contact switch mechanism (not shown) to provide early-break and late-make contacts that prevent voltage and current loads through fuseholder 100 from breaking or making at the main housing fuse clips.

Figure 3:
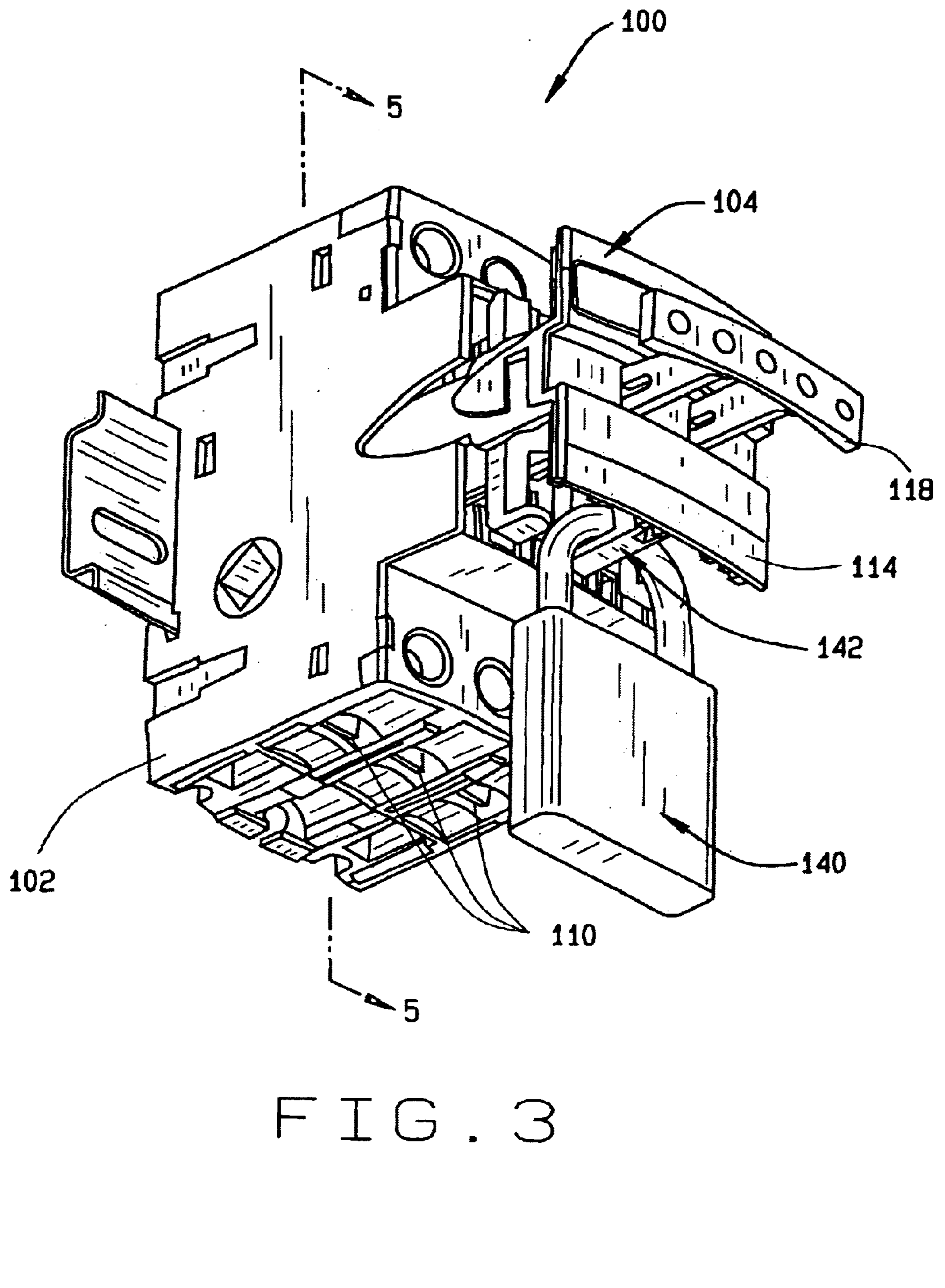
FIG. 3 is a perspective view of the fuseholder shown in FIGS. 1 and 2 and in a lock out position.

FIG. 3 illustrates fuseholder 100 in a lock out position wherein drawer 104 is fully extended from main housing 102 using retractable handle 118, fuses 106 (shown in FIG. 1) are removed, and a lock member, such as padlock 140 is inserted through a drawer frame 142 between drawer front cover 114 and main housing 102. Therefore, fuses 106 are prevented from being replaced and fuse drawer 104 is prevented from being closed to complete an electrical circuit through fuseholder 100. As such, it can be ensured that load side equipment coupled to wiring ports 110 remains de-energized as desired. In an alternative embodiment, other known lock mechanisms are used in lieu of padlock 140 to prevent fuse drawer 104 from closing and undesirably energizing electrical circuits or components.

Figure 4:
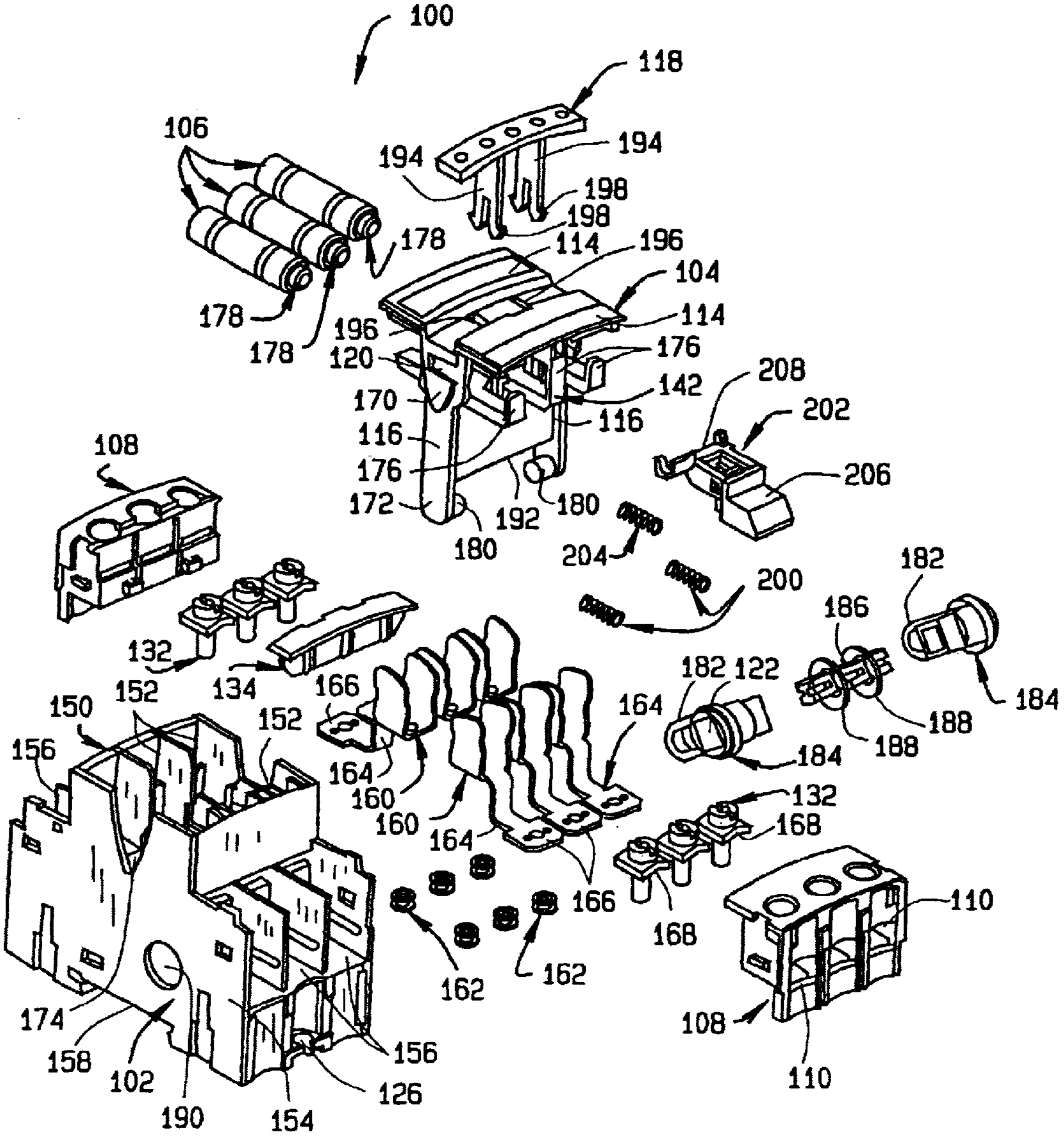
FIG. 4 is an exploded view of the fuseholder shown in FIGS. 1 and 2.

FIG. 4 is an exploded view of fuseholder 100 illustrating internal components. Main housing 102 includes a fuse clip portion 150 forming individual fuse clip receptacles 152, and a terminal portion 154 extending from clip portion 150 and forming individual terminal compartments 156. Mounting bosses 126 extend from terminal portion 154 below terminal compartments 156 for chassis mounting of main housing 102. A DIN rail slot 158 extends beneath main housing 102 for attachment to DIN rail 124 shown in FIG. 1.

Fuse clips 160 are received in fuse clip receptacles 152 of main housing 102, and are attached to fuse clip receptacles 152 with tubular rivets 162. Terminal bridges 164 extend from fuse clips 160 into terminal compartments 156 of main housing 102 and connect fuse clips 160 with terminal pads 166. Screw terminals 132 are received through terminal pads 166 and include pressure plates 168 for engaging a stripped wire (not shown) inserted through wiring ports 110 of terminal covers 108 that are attached to main housing 102 and substantially enclose terminal compartments 156.

Fuse drawer 104 includes lateral extensions 116 that extend between fuse clips 160 and into main housing 102. A medallion shaped projection 170 extends from an outer surface 172 of each lateral extension 116 and abuts a complementary shaped opening 174 in main housing 102 when fuse drawer 104 is fully closed. Dovetail slot 120 extends through medallion shaped projection 170 for receiving an interlocking projection (not shown) of another component, such as a fuse drawer attachment (not shown in FIG. 4) that is desirably mounted stationary to fuse drawer 104, and hence moves with fuse drawer 104 as fuse drawer 104 is opened and closed. Drawer frame 142 extends beneath drawer front cover 114 and forms individual fuse supports 176 that each support a ferrule 178 of fuses 106. The central fuse support 176 forms a lockable opening for receiving a lock member, such as padlock 140 (shown in FIG. 3), while the other fuse supports 176 are open-ended to facilitate insertion of the lock member.

A cam bearing boss 180 is located on each lateral extension 116 of drawer 104 opposite drawer front cover 114. Bosses 180 are received in cams 182 extending from cam actuators 184 that are mounted in main housing 102 beneath fuse clip receptacles 152 and between fuse terminal receptacles 156. A square shaft 186 engages cam actuators 184 and is retained to cam actuators 184 by retaining clips 188, and cam actuators 184 are received in cam openings 190 in either side of main housing 102. As such, cam actuators 184 are rotatably mounted to main housing 102, and when drawer extension bosses 180 are engaged to cams 182, rotary motion of cam actuators 184 translates to substantially linear displacement of drawer 104, and vice-versa. Cam actuator openings 122 of each cam actuator 184 are accessible through openings 190 in main housing 102 for remote mechanical actuation of fuse drawer 104.

A flat shelf 192 extends between lateral extensions 116 of drawer 104, and handle 118 includes two lateral extensions 194 including slotted ends for receiving shelf 192 when drawer 104 is fully closed. Handle extensions 194 are fitted through openings 196 in drawer front cover 114, and extensions 194 extend through and are substantially aligned with fuse supports 176 so as to provide a clearance for fuses 106. Slotted ends of extensions 194 include barbs 198 providing stops to preclude an extension of handle 118 through drawer cover openings 196 and to prevent removal of handle 118 from drawer front cover 114. In a further embodiment, slotted ends of handle extensions 194 are slightly wider and/or thicker than a remainder of extensions 194 to create a plastic interference when drawer handle 118 is in a retracted position. Therefore, a small amount of force is necessary to return handle 118 to its retracted position, thereby frustrating unintentional opening of fuse drawer 104. A similar plastic interference is employed in drawer front shelf by a projection (not shown in FIG. 4) that interferes with main housing 102 as fuse drawer 104 is closed, thereby frustrating casual opening of drawer 104.

DIN rail springs 200 are provided adjacent DIN rail slot 158 in main housing 102 to provide a biasing force to maintain main housing 102 in a desired position relative to DIN rail 124 (shown in FIG. 1).

An auxiliary contact actuator 202 and contact actuator spring 204 are provided for easy upgrading of fuseholder 100 to accommodate plug-in attachment of an optional auxiliary contact switch mechanism (not shown) to provide early-break and late-make contacts that prevent voltage and current loads through fuseholder 100 from breaking or making at fuse clips 160 in main housing 102. As will be further explained below, auxiliary contact actuator 202 includes a positioner portion 206 that engages drawer shelf 192 and a signal portion 208 that is used to generate a signal through the contact switch mechanism. The signal is indicative of a position of drawer 104 for executing advanced features, including but not limited to early-break and late-make connection of voltage and current loads to fuseholder 100. Removable auxiliary contact cover 134 provides access to contact actuator signal portion 208 on an as needed basis.

Figure 5:
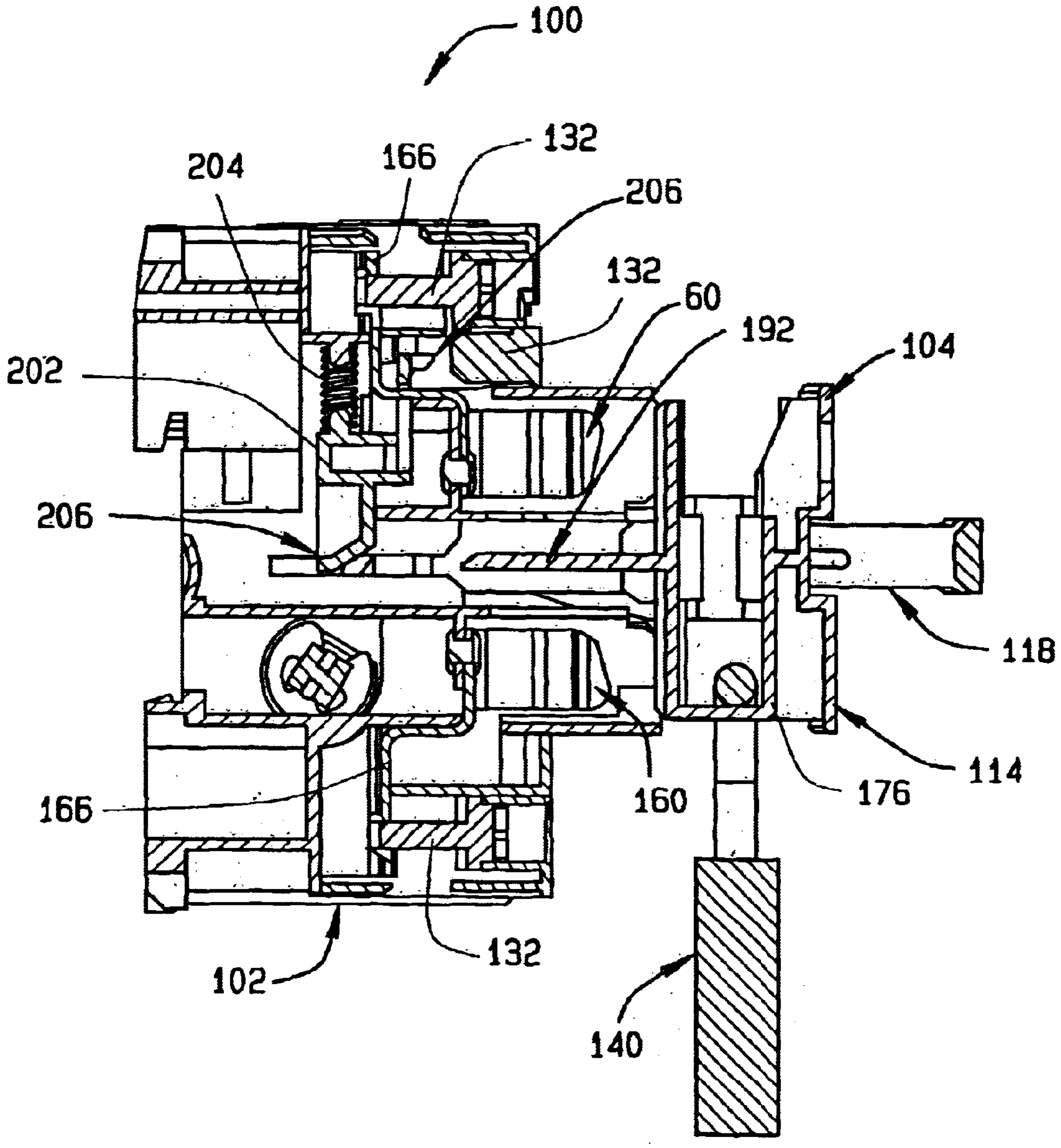
FIG. 5 is a sectional view of the fuseholder along line 5—5 of FIG. 3.

FIG. 5 is a sectional view of fuseholder 100 through center fuse support 176 when drawer 104 is in a fully opened position relative to main housing 102 and when handle 118 is fully extended with respect to drawer front cover 114. Fuses 106 are removed and padlock 140 is installed to prevent fuse drawer 104 from being closed. Fuse clips 160 extend in fuse clip receptacles 152 (shown in FIG. 4), and terminal pads 166 extend from fuse clips 160 for line side and load side electrical connections with screw terminals 132. Drawer shelf 192 is positioned between fuse clips 160, and auxiliary contact actuator 202 is biased downward by contact actuator spring 204 to a first or open position. In this position, contact actuator portion 206 activates a set of switches (not shown) to operate auxiliary control contacts (not shown) for opening a power contactor (not shown). In one embodiment (not shown), auxiliary contact cover 134 is removed and a known switch assembly (not shown) is plugged into fuseholder 100 in place of contact cover 132, and the switches are wired to a power contactor according to known techniques.

When fuse drawer 104 is closed, drawer shelf 192 engages contact actuator positioner portion 206 and forces contact actuator linearly upward approximately 1.5 mm against the bias of spring 204 to a second or closed position (not shown) wherein contact actuator portion 206 activates the set of switches to operate auxiliary control contacts for closing the power contactor. Thus, as contact actuator 202 moves between the first and second positions, the set of switches are actuated for late-making and early-breaking of voltage and current loads at the power contactor rather than within fuseholder 100. Therefore, unlike known fuseholders including permanently mounted auxiliary contacts, added costs of the contacts, switches and associated assemblies are reserved only for instances where they are desired, and the switches and assemblies are easily installed with plug-in installation to upgrade fuseholder 100 for these advanced features. In addition, linear displacement of contact actuator 202 further reduces costs by avoiding more expensive rotary contact actuators of conventional fuseholders.

Figure 6:
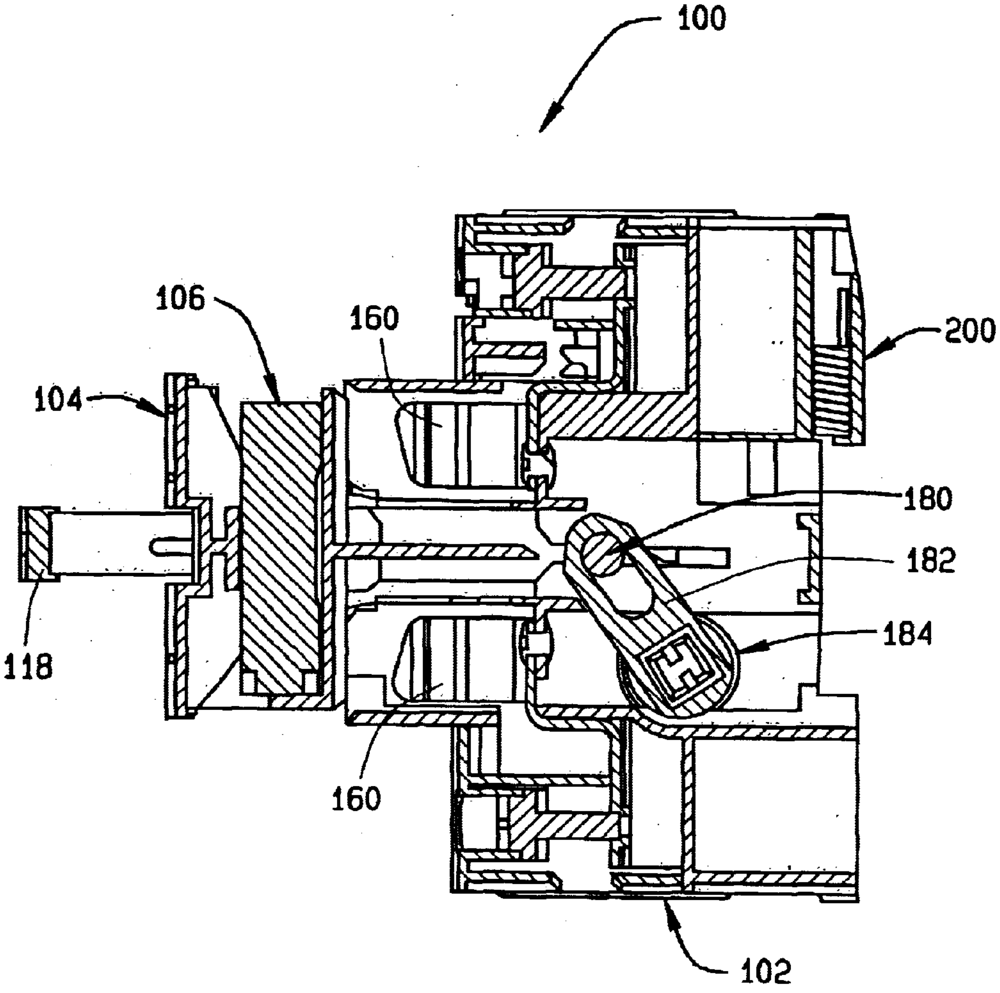
FIG. 6 is a sectional view of the fuseholder along line 6—6 of FIG. 1.

FIG. 6 is a sectional view of fuseholder 100 through a portion of cam actuator 184 and illustrating engagement of drawer lateral extension boss 180 with cam 182. Fuse drawer 104 is illustrated in the open position and a fuse 106 is installed in fuse support 176. As fuse drawer 104 is closed, boss 180 is moved backward (to the right in FIG. 6) into main housing 102, and cam 182 is rotated backward (clockwise in FIG. 6) until drawer 104 is fully closed. Likewise, as fuse drawer 104 is opened, boss 180 moves forward (to the left in FIG. 6) and cam 180 is rotated forward (counter-clockwise in FIG. 6) until drawer 104 is in the fully open position that provides an adequate clearance to install or remove a fuse 106 while preventing fuse drawer from being completely removed from main housing 102 and exposing conductive metal surfaces of fuse clips 160. When cam actuator 184 is rotated with a rotary device (not shown) for remote positioning of fuse drawer via cam actuator openings 122 (shown in FIGS. 1 and 4), rotary motion of cams 182 produces a corresponding linear displacement of bosses 180, and hence opens and closes fuse drawer 104.

Figure 7:
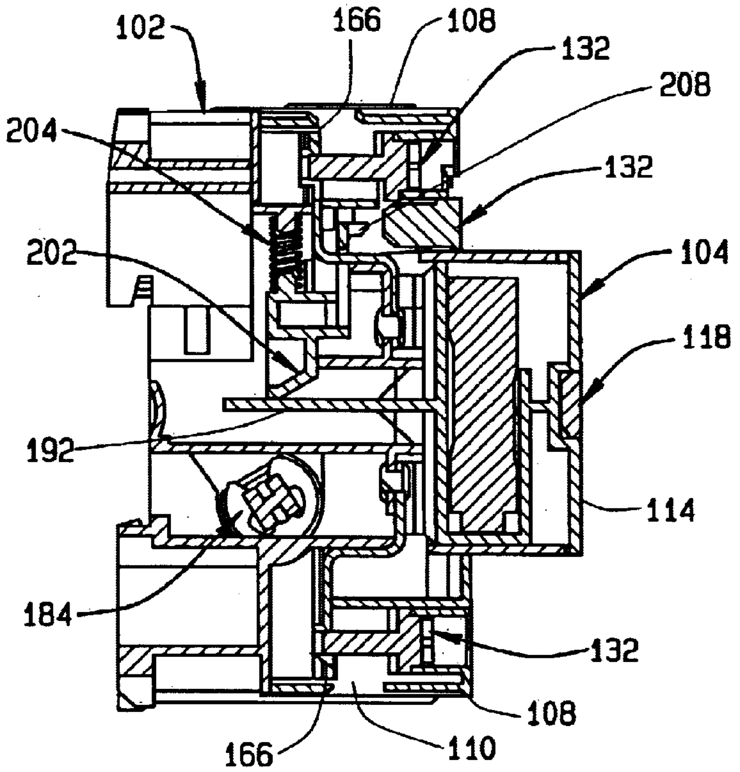
FIG. 7 is a sectional view of the fuseholder along line 7—7 of FIG. 2.

FIG. 7 is a sectional view of fuseholder 100 in the closed position suitable for voltage and current loading. Drawer 104 is fully closed and handle 118 is in the fully retracted position and is substantially flush with drawer front cover 114 to prevent easy manipulation of handle 118. Cam actuator 184 is in the backward position, and contact actuator 202 is displaced upwardly, or vertically, by drawer shelf 192 to the second or closed position described above in relation to FIG. 5. Fuse 106 is situated within fuse clips 160 (shown in FIGS. 4–6), and screw terminals 132 are received by contact pads 166 for electrical connections through wiring ports 110 in terminal covers 108. Auxiliary contact cover 134 is removably attached to main housing 102 for access to auxiliary contact actuator portion 208.

Figure 8:
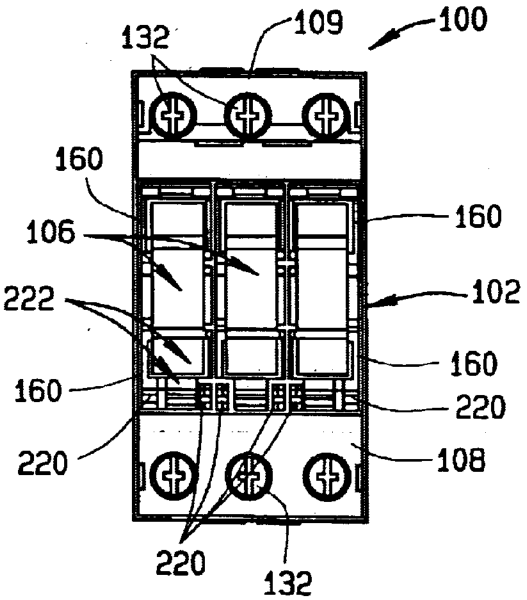
FIG. 8 is a front elevational view of the fuseholder shown in FIG. 1 with parts removed.

FIG. 8 illustrates fuseholder main housing 102 loaded with fuses 106 and drawer 104 removed to illustrate a fuse rejection feature. Fuses 106 are fit into fuse clips 160 within fuse clip receptacles 156 (shown in FIG. 4), and terminal covers 108 are affixed to main housing 102 for electrical connections through fuses 106 with screw terminals 132. Fuse rejecting projections 220 extend into a portion of fuse receptacles 156 so that only certain fuses can be installed in fuseholder 100.

In an exemplary embodiment fuse rejection projections 220 are integrally formed with main housing 102 and are dimensioned to accept only UL Class CC fuses which are characterized by a dual diameter ferrule 222 that is accommodated by fuse rejecting projections 220. Other types of fuses, such as IEC 10×38 fuses and lower capacity fuses that do not have such a dual diameter ferrule are not usable in fuseholder 100 due to fuse rejection projections 220. In an alternative embodiment, fuse rejection projections 220 are not employed and fuseholder 100 may accept a variety of fuses.

Figure 9:
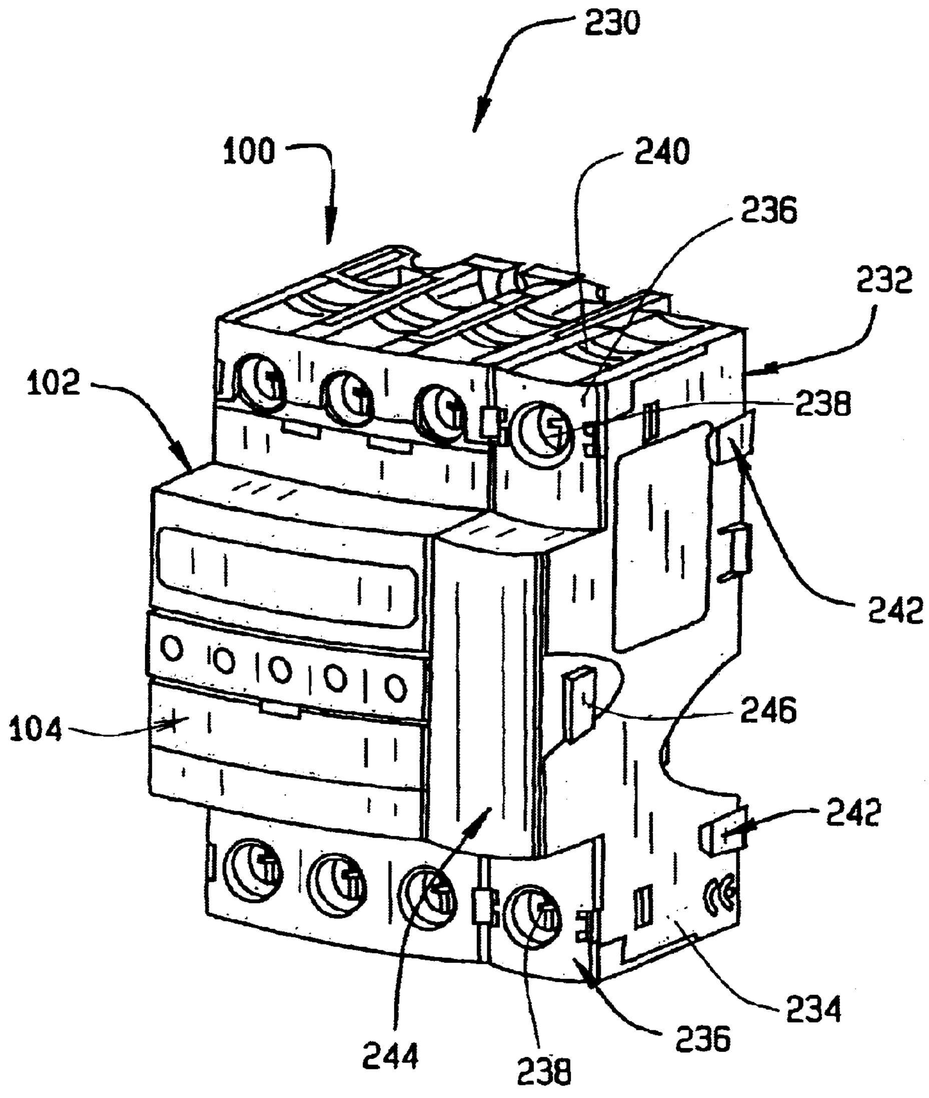
FIG. 9 is a perspective view of a second embodiment of a fuseholder.

FIG. 9 is a perspective view of a second embodiment of a fuseholder 230 including fuseholder 100 with an attached additional pole assembly 232. Additional pole assembly 232 includes a housing 234 including a pair of fuse clips (not shown) and terminal pads (not shown) similar to fuse clips 160 and terminal pads 166 (shown in FIG. 4), and terminal covers 236 providing access to screw terminals 238 for electrical connections through wiring ports 240. Thus, housing 234 is constructed similarly to main housing 102 of fuseholder 100 but only accommodates a single fuse. Housing 234 includes dovetail projections 242 for interlocking engagement with dovetail slots 112 (shown in FIG. 1) on either side of main housing 102 of fuseholder 100. Thus, housing 234 may be attached to main housing 100 on either side of fuse drawer 104 for greater versatility and installation options in the field.

A fuse drawer attachment 244 is coupled to fuse drawer 104 with a dovetail projection 246 received in fuse drawer lateral extension dovetail slot 120 (shown in FIGS. 1 and 4). Consequently, drawer attachment 244 is mounted stationary to fuse drawer 104 and therefore opens and closes with fuse drawer 104. Fuse drawer attachment 244 includes a fuse support similar to fuse supports 176 (shown in FIG. 4) so that when fuse drawer 104 is opened, a fuse may be installed, replaced, or removed in fuse drawer attachment 244. Drawer attachment 244 encloses housing 234 when fuse drawer 104 is in the closed position to prevent exposure to energized metal surfaces of the fuse and fuse clips in additional pole assembly 232.

In various embodiments, a fuse rejection feature, such as that described above, may be employed in additional pole housing 234, whether the same or different from that employed in main housing 102.

Therefore, using additional pole assembly 232, four fuses are accommodated by fuseholder 230. A fifth fuse is accommodated in a further embodiment by installing another additional pole assembly 232 opposite the first. It is contemplated that additional pole assembly 232, in further embodiments, can be constructed to accommodate more than one additional fuse to further increase a number of fuses accommodated by fuseholder 230.

Figure 10:
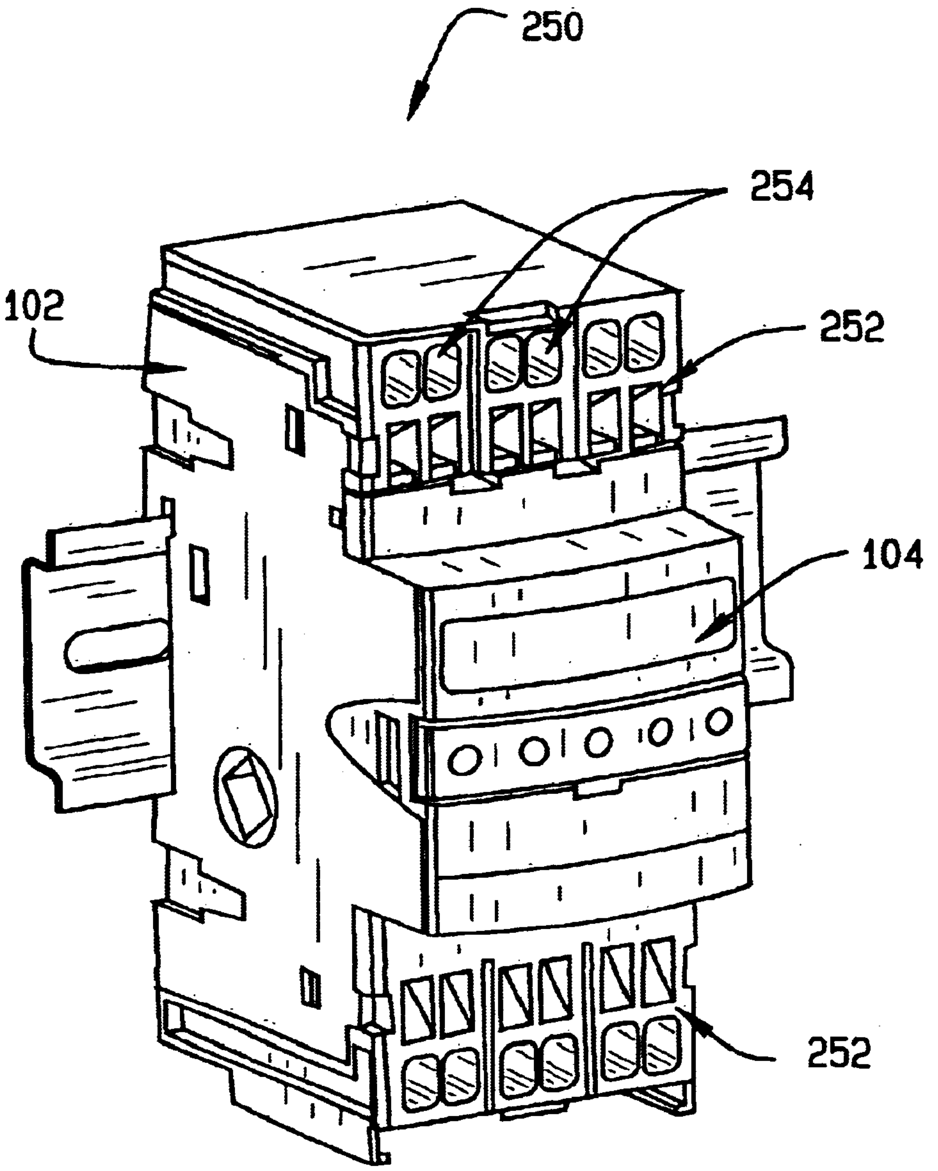
FIG. 10 is a perspective view of a third embodiment of a fuseholder.

FIG. 10 illustrates a third embodiment of a fuseholder 250 similar to fuseholder 100 described above but including spring terminals (not shown in FIG. 10) and spring terminal covers 252 in lieu of screw terminals 132 (shown in FIG. 4) and screw terminal covers 108 (shown in FIG. 4). Thus, fuseholder 250 is otherwise constructed and operates as described above in relation to FIGS. 1–8, and further except that electrical connections are made to the spring terminals through wiring ports 254 in spring terminal covers 252 rather than with screw terminals 132 and wiring ports 110 (shown in FIG. 4). In a further embodiment, an additional pole assembly (not shown) is employed similar to additional pole assembly 232 (shown in FIG. 9 and described above) but employing spring terminals and a spring terminal cover in lieu of screw terminals and screw terminal covers 232 (shown in FIG. 9).

Figure 11:
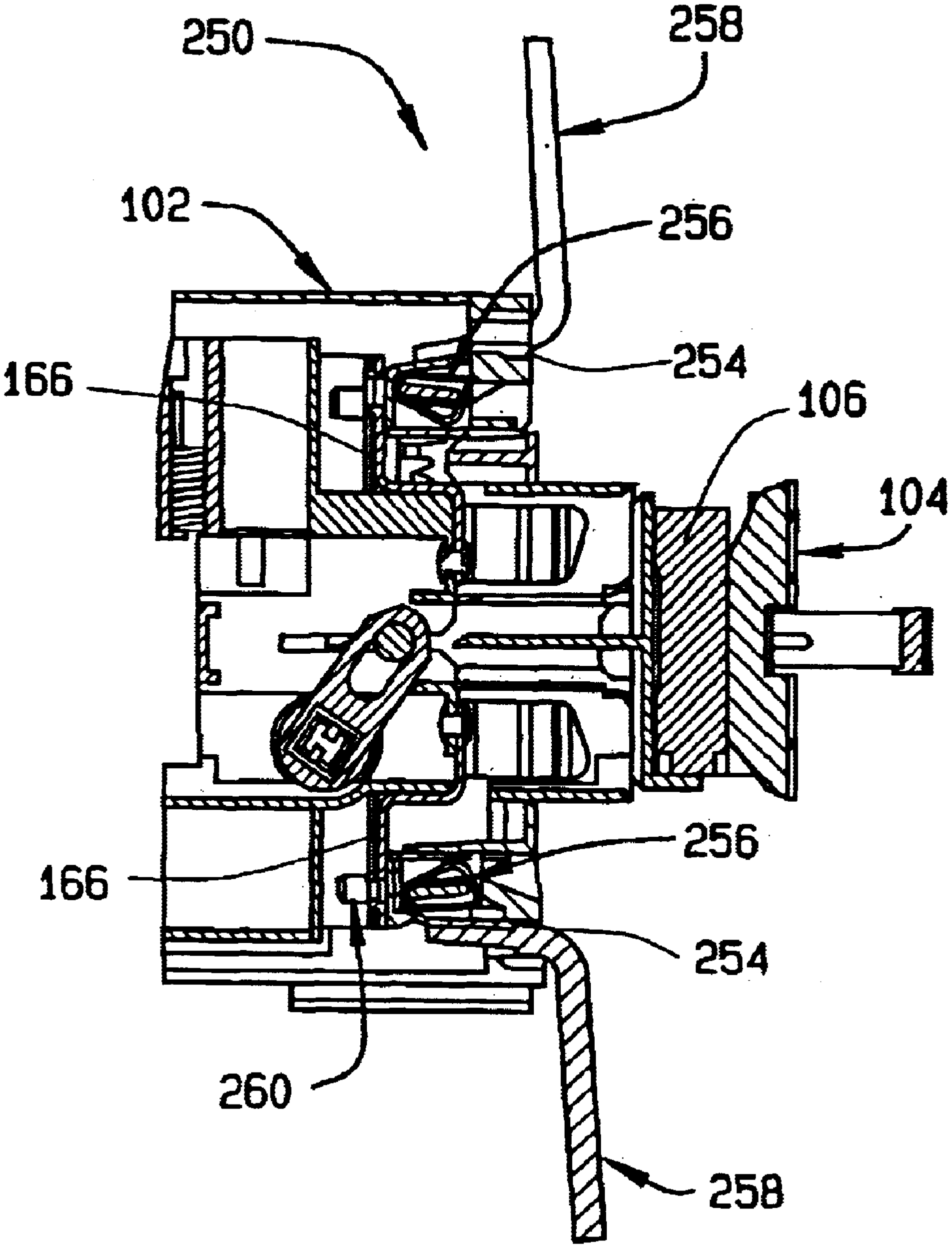
FIG. 11 is a sectional view of the fuseholder shown in FIG. 10.

FIG. 11 is a sectional view of fuseholder 250 illustrating wired connections to spring terminals 256 through wiring ports 254. Stripped wires 258 are inserted through wiring ports 254 and engaged to spring terminals 256, which in an exemplary embodiment are known cage clamps such as those available from PHOENIX CONTACT Inc. of Middletown, Pa. and the WAGO® Corporation of Germantown, Wis. Spring terminals 256 are coupled to terminal pads 166 with connecting screws 260. Spring terminals 256 facilitate ease of electrical connections to fuseholder 250 without the use of tools, provided that wires 258 are pre-stripped at their ends. In alternative embodiments other spring terminals and clamping mechanisms are employed in lieu of cage clamps to achieve similar benefits.

Figure 12:
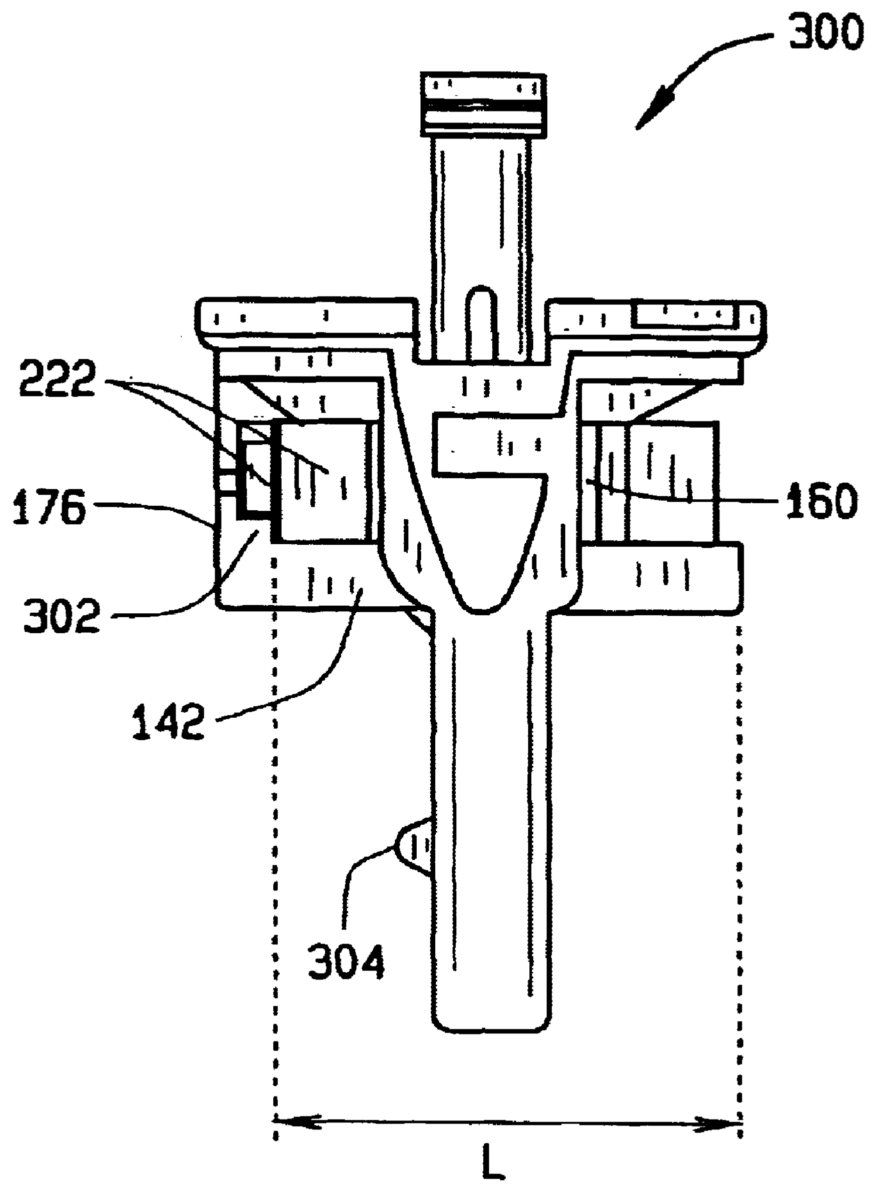
FIG. 12 is a side elevational view of a second embodiment of a fuse drawer.

FIG. 12 is a side elevational view of a second embodiment of a fuse drawer 300 wherein common elements with fuse drawer 104 (shown and described above in relation to FIGS. 1–7 and 9–11) are identified with like reference characters. Fuse drawer 300 is constructed substantially similar to fuse drawer 104 but includes a fuse rejection member 302 extending from drawer frame 142 and fuse supports 176. Fuse rejection is therefore provided directly in drawer 300 to more easily identify mismatched fuse conditions. Drawer rejection member 302 restricts an opening or clearance at one end of fuse supports 176 to accommodate dual diameter ferrules 222 of a UL Class CC fuse, while preventing other types of fuses, e.g., flat ferrule fuses, from extending past fuse rejection member 302. A length L of drawer frame 142 extending from rejection member 302 is selected so that when other types of fuse ferrules (not shown) abut fuse rejection member 302, an end of the fuse overhangs or extends beyond drawer frame 142 and prevents drawer 300 from being closed. In other words, L is selected to be shorter than a length of a fuse to be rejected so that the fuse itself interferes with operation of door 300.

In one embodiment, fuse rejection member 302 is integrally formed with drawer frame 124 and/or fuse supports 176. In an alternative embodiment, fuse rejection member is separately provided. In further embodiments, differently dimensioned fuse rejection members 302 are employed to reject other types of fuses, and different fuse supports 176 in drawer 300 include differently dimensioned fuse rejection members to reject different types of fuses. In a still further embodiment less than all fuse supports 176 in drawer 300 include fuse rejection members 302.

In addition, drawer flat shelf 192 (shown in FIG. 4) includes a projection 304 extending therefrom that creates a plastic interference with switch main housing 102 (shown in FIG. 4) as drawer 300 is moved into a closed position. As such, some force is required to close the door against the resistance of the interference of projection 300 and main housing 102, and unintentional closing of the drawer 300 is generally prevented.

Fuse drawer 300 may be used with any of the above-described embodiments of fuseholders, and may further be used in conjunction with fuse rejection features incorporated into main housings of the fuseholders. Except as noted with respect to fuse rejection, fuse drawer 300 operates as described above with respect to fuse drawer 104.

Figure 13:
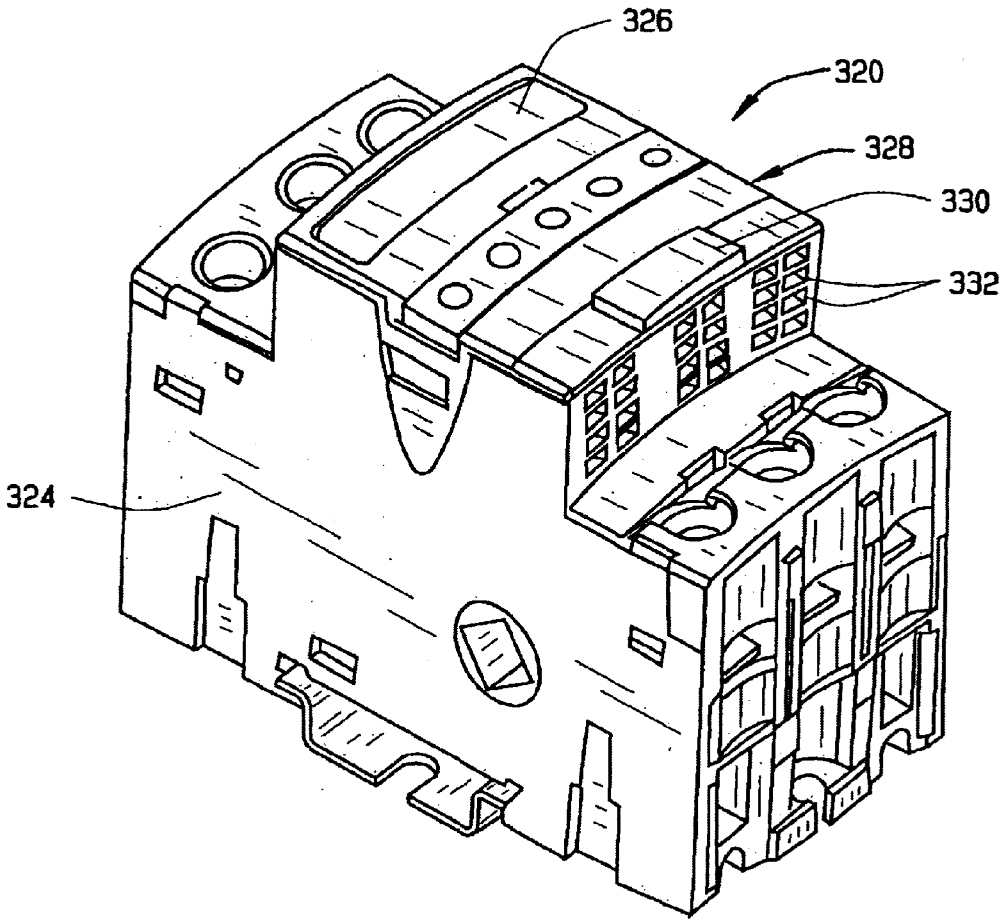
FIG. 13 is a perspective view of a fourth embodiment of a fuseholder.

FIG. 13 illustrates yet another embodiment of a fuseholder 320 including additional features that may be likewise incorporated into any of the above-described embodiments. More specifically, fuseholder 320 includes a plurality of ventilation ports 322 extending through a main housing 324 adjacent drawer front cover 326 when drawer 328 is closed. Thus, heat generated from current flowing through fuses and conductive fuse clips and conductive terminal portions located within main housing 324 may be dissipated to the ambient environment.

In addition, a circuit identification tab 330 is mounted to drawer front cover for providing visual indicia of circuitry to be corrected by fuseholder 320. Especially when used in large electrical systems with many fuseholders, tab 330 simplifies identification of appropriate electrical subsystems for maintenance purposes.

A versatile fuseholder is thereby provided that is particularly suited for industrial control devices and for use with UL Class CC fuses and IEC 10×38 fuses. The retractable fuse drawer handle prevents easy opening of the fuse drawer when the fuses are under load. Fuse rejection is provided to ensure proper fuses are used with the fuseholder. The auxiliary contact actuator facilitates use of switching assemblies on an as needed basis. Screw terminal and spring terminal wiring options are provided, and the drawer may be safely locked in an open position to prevent energization of a circuit through fuses. The additional pole assembly provides simple modification of the fuseholder to accommodate varying numbers of fuses. A safer, lower cost, easily manufacturable modular fuseholder is therefore provided that that may be easily and conveniently upgraded for advanced features as desired by the end user.

While the invention has been described in terms of various specific embodiments, those skilled in the art will recognize that the invention can be practiced with modification within the spirit and scope of the claims.

What is claimed is:

1. A fuseholder comprising:

a main housing configured for receiving a plurality of cartridge fuses;

a fuse drawer configured for slidable insertion into said main housing, said fuse drawer selectively positionable between an open position and a closed position; and a handle slidably coupled to said drawer for opening said drawer, said handle extended through said drawer and selectively positionable between an extended position and a retracted position relative to said drawer, said handle substantially flush with said drawer when in the retracted position.

2. A fuseholder in accordance with claim 1, said drawer comprising a handle recess adjacent said drawer.

3. A fuseholder in accordance with claim 1 further comprising an additional pole housing mounted to said fuse drawer.

4. A fuseholder in accordance with claim 1, said fuse drawer comprising a drawer frame, said drawer frame comprising at least one lock opening therethrough.

5. A fuseholder in accordance with claim 1 further comprising at least one fuse rejection member.

6. A fuseholder in accordance with claim 1, said main housing further comprising an auxiliary contact actuator selectively positionable between a first position and a second position, said position of said actuator determined by a position of said drawer.

7. A fuseholder in accordance with claim 1 further comprising at least one screw terminal.

8. A fuseholder in accordance with claim 1 further comprising at least one spring terminal.

9. A fuseholder comprising:

a main housing;

a plurality of fuse clips in said housing for receiving a plurality of cartridge fuses;

a fuse drawer slidably mounted to said main housing, said fuse drawer comprising a plurality of fuse supports, said fuse drawer selectively positionable between a fully closed position and a fully opened position, and an auxiliary contact actuator mounted to said main housing, said auxiliary contact actuator displaced by said drawer as said drawer is moved between the fully opened and fully closed position.

10. A fuseholder in accordance with claim 9, said drawer comprising a drawer shelf extending from at least one of said fuse supports, said drawer shelf contacting said auxiliary contact actuator and displacing said auxiliary contact actuator as said drawer is moved.

11. A fuseholder in accordance with claim 10 wherein said auxiliary contact actuator is movable between a first position and a second position, said first positioned substantially linearly displaced from the second position.

12. A fuseholder in accordance with claim 9, at least one of said fuse supports comprising a lock opening.

13. A fuseholder in accordance with claim 9 wherein said drawer comprises a retractable handle.

14. A fuseholder in accordance with claim 9 wherein at least one of said main housing and said fuse drawer includes at least one fuse rejection member.

15. A fuseholder in accordance with claim 9, said main housing further including a plurality of terminal pads extending from said fuse clips, said fuseholder further comprising at least one terminal cover enclosing said terminal pads, and a plurality of screw terminals for engaging said terminal pads.

16. A fused assembly for an industrial control device, said fused assembly comprising:

a main housing comprising a plurality of fuse receptacles and a plurality of terminal compartments;

a fuse clip mounted to each said fuse receptacle;

a terminal pad mounted to each said terminal compartment, each said fuse clip electrically connected to a respective terminal pad;

a fuse drawer mounted to said main housing for sliding movement between an open position and a closed position, said fuse drawer comprising a plurality of fuse supports, a retractable handle, and a drawer frame comprising a lock opening;

a plurality of cartridge fuses within said fuse supports, said plurality of fuses electrically coupled to said fuse clips when said drawer is in the closed position, said fuses pulled from said fuse clips when said drawer in is the open position.

17. A fused assembly in accordance with claim 16 further comprising a handle recess adjacent said retractable handle for releasing said handle.

18. A fused assembly in accordance with claim 16 wherein said main housing is substantially 45 mm wide.

19. A fused assembly in accordance with claim 18 wherein said main housing comprises three fuse receptacles.

20. A fused assembly in accordance with claim 18 wherein said fuses comprise UL Class CC fuses.

* * * * *